United States Patent
Hayee et al.

(10) Patent No.: US 6,614,586 B2
(45) Date of Patent: Sep. 2, 2003

(54) METHODS AND SYSTEMS FOR HIGH PERFORMANCE, WIDE BANDWIDTH OPTICAL COMMUNICATION SYSTEMS USING RAMAN AMPLIFICATION

(75) Inventors: M. Imran Hayee, Woodstock, MD (US); William Shieh, Columbia, MD (US); Quan Zhen Wang, New York, NY (US)

(73) Assignee: Dorsal Networks, Inc., Columbia, MD (US)

( * ) Notice: Subject to any disclaimer, the term of this patent is extended or adjusted under 35 U.S.C. 154(b) by 0 days.

(21) Appl. No.: 09/917,266

(22) Filed: Jul. 30, 2001

(65) Prior Publication Data

US 2003/0053194 A1 Mar. 20, 2003

(51) Int. Cl.[7] .............................. H01S 3/30; H04B 10/00
(52) U.S. Cl. ........................ 359/334; 359/161; 359/124
(58) Field of Search ................. 359/114, 124, 359/154, 161, 177, 334

(56) References Cited

U.S. PATENT DOCUMENTS

| | | | |
|---|---|---|---|
| 3,705,992 A | 12/1972 | Ippen et al. | 307/88.3 |
| 4,401,364 A | 8/1983 | Mochizuki | 350/96.16 |
| 4,616,898 A | 10/1986 | Hicks, Jr. | 350/96.15 |
| 4,805,977 A | 2/1989 | Tamura et al. | 350/96.16 |
| 5,764,405 A | 6/1998 | Alphonsus | 359/341 |
| 5,847,862 A * | 12/1998 | Chraplyvy et al. | 359/164 |
| 5,920,423 A | 7/1999 | Grubb et al. | 359/341 |
| 5,991,069 A | 11/1999 | Jander | 359/337 |
| 6,011,892 A * | 1/2000 | Chraplyvy et al. | 385/100 |
| 6,040,933 A * | 3/2000 | Khaleghi et al. | 359/110 |
| 6,052,219 A | 4/2000 | Kidorf et al. | 359/334 |
| 6,052,393 A | 4/2000 | Islam | 372/6 |
| 6,088,152 A * | 7/2000 | Berger et al. | 359/124 |
| 6,122,298 A | 9/2000 | Kerfoot, III et al. | 372/6 |
| 6,134,032 A | 10/2000 | Kram et al. | 359/110 |
| 6,134,033 A | 10/2000 | Bergano et al. | 359/122 |
| 6,137,604 A | 10/2000 | Bergano | 359/124 |
| 6,141,468 A | 10/2000 | Kidorf et al. | 385/24 |
| 6,147,794 A | 11/2000 | Stentz | 359/354 |
| 6,147,796 A | 11/2000 | Ma et al. | 359/341 |
| 6,151,160 A | 11/2000 | Ma et al. | 359/341 |
| 6,181,464 B1 | 1/2001 | Kidorf et al. | 359/334 |
| 6,259,543 B1 * | 7/2001 | Golovchenko et al. | 359/110 |
| 6,292,288 B1 | 9/2001 | Akasaka et al. | 359/334 |

(List continued on next page.)

FOREIGN PATENT DOCUMENTS

| | | | |
|---|---|---|---|
| WO | WO 00/49740 | * | 8/2000 |
| WO | WO 00/65760 | * | 11/2000 |

OTHER PUBLICATIONS

Yu et al. "Optimisation of Wavelength Spacing in a WDM Transmission System in teh Presence of Fibre Nonlinearities." IEE Proc. Optoelectron, 142:4, Aug. 1995, pp. 190–196.*

(List continued on next page.)

Primary Examiner—Thomas G. Black
Assistant Examiner—Andrew R Sommer

(57) ABSTRACT

A method and system for equalizing Q performance of a wideband, Raman-amplified optical communication system are disclosed. Wideband, Raman-amplifed systems suffer significant performance degradation from nonlinear effects in shorter wavelength channels. Absent compensation, the shorter wavelength channels limit system performance and restrict the amount of launch power that can be employed for the optical data signals in each wave division multiplexed channel. Careful design that employs increased channel spacing in the nonlinear region of the bandwidth can offset the increased nonlinear effects, thereby improving the worst channel's Q performance and permitting high launch power without unacceptable Q performance.

30 Claims, 15 Drawing Sheets

U.S. PATENT DOCUMENTS

| | | | |
|---|---|---|---|
| 6,320,884 B1 | | 11/2001 | Kerfoot, III et al. ............. 372/3 |
| 6,323,993 B1 | * | 11/2001 | Hansen et al. ............... 359/337 |
| 6,344,922 B1 | * | 2/2002 | Grubb et al. ................ 359/134 |
| 6,356,383 B1 | * | 3/2002 | Cornwell, Jr. et al. ....... 359/334 |
| 6,388,801 B1 | * | 5/2002 | Sugaya et al. ............... 359/334 |
| 6,424,455 B1 | * | 7/2002 | Dmitri ......................... 359/334 |
| 6,445,492 B1 | * | 9/2002 | Nielsen et al. ............... 359/334 |
| 6,452,707 B1 | * | 9/2002 | Puc et al. ..................... 359/124 |
| 6,455,492 B1 | * | 9/2002 | Reyes et al. ............. 435/235.1 |
| 2002/0044339 A1 | | 4/2002 | Chesnoy et al. ............ 359/337 |
| 2002/0114062 A1 | | 8/2002 | Simard et al. ............... 359/337 |
| 2002/0114555 A1 | * | 8/2002 | Seydnejad et al. ............ 385/15 |

OTHER PUBLICATIONS

Scheerer et al. "SRS Crosstalk in Preemphasized WDM Systems." OFCC 2000, vol. 2, Mar. 2000, pp. 293–295.*

Namiki et al. "Broadband Raman Amplifiers Design and Practice." Opt. Amplifiers and their App., Jul. 2000, pp. 21–24.*

Aoki, Yasuhiro. "Properties of Fiber Raman Amplifiers and Their Applicability to Digital Optical Communication Systems." J. Lightwave Tech. 6:7, Jul. 1988, pp. 1225–1239.*

Chungpeng et al. "Optical Fiber Telecommunications IIIA" (Ed. by Ivan P. Kaminow & Thomas L. Koch), 1997, pp. 292–294.*

Hwang et al. "A Generalized Suboptimum Unequally Spaced Channel Allocation Technique–Part I: In IM/DD WDM System." IEEE Trans. on Comm., 46:8, Aug. 1998, pp. 1027–1037.*

Tonguz et al. "A Generalized Suboptimum Unequally Spaced Channel Allocation Technique–Part II: In Coherent WDM Systems." IEE Trans. on Comm., 46:9, Sep. 1998, pp. 1186–1193.*

Maeda et al. "The Effect of Four–Wave Mixing in Fibers on Optical Frequency–Division Multiplexed Systems." J. Lightwave Tech. 8:9, Sep. 1990, pp. 1402–1408.*

Chang et al. "Determination of FWM Products in Unequal–Spaced–Channel WDM Lightwave Systems." J. Lightwave Tech. 18:12, Dec. 2000., pp. 2113–2122.*

Matera et al. "Comparison of the Performance pf Optically Amplified Transmission Systems." J. Lightwave Tech. 14:1, Jan. 1996, pp. 1–12.*

Forghieri et al. "WDM Systems with Unequally Spaced Channels." J. Lightwave Tech. 13:5, May 1995, pp. 889–897.*

Eiselt et al. "Limits on WDM Systems Due to Four–Wave Mixing: A Statistical Approach." J. Lightwave Tech., 17:11, Nov. 1999, pp. 2261–2267.*

Numai et al. "Analysis of Repeated Unequally Spaced Channels for FDM Lightwave Systems." J. Lightwave Tech. 18:5, May 2000, pp. 656–664.*

Sardesai, H.P. "A Simple Channel Plan to Reduce Effects of Nonlinearities in Dense WDM Systems." CLEO 1999, May 1999, pp. 183–184.*

Yang et al. "Nonlinear Crosstalk and Two Countermeasures in SCM–WDM Optical Communication Systems." J. Lightwave Tech. 18:4, Apr. 2000, pp. 512–520.*

McIntosh et al. "Eliminating SRS Channel Depletion in Massive WDM Systems via Optical Filtering Techniques." IEEE Photonics Tech. Lett. 13:4, Apr. 2001, pp. 302–304.*

Mazurczyk et al. "Accumulation of Gain Tilt in WDM Amplified Systems Due to Raman Crosstalk." IEEE Photonics Tech. Lett. 12:11, Nov. 2000, pp. 1573–1575.*

Seo et al. "Compensatino of Raman–Induced Crosstalk Using a Lumped Germanosilicate Fiber Raman Amplifier in the 1.571–1.591–um Region." IEEE Photonics Tech. Lett. 13:1, Jan. 2001, pp. 28–30.*

Tonguz et al. "Gain Equalization of EDFA Cascades." J. Lightwave Tech. 15:10, Oct. 1997, pp. 1832–1841.*

M. Nakazawa et al., "160 Gbit/s (80Gbit/sx2 channels) WDM soliton transmission over 10000km using in–line synchronous modulation" Electronic Letters Pub. Aug. 1999, vol. 35, No. 16, pp. 1358–1359.

Arthur F. Judy et al., "Fiber Effective Area and Raman–Pumped 40 Gb/s Transmission Systems", Lucent Technologies, pp. 143–145, No date.

Yutaka Miyamoto, "320 Gbit/s) WDM transmission over 367–km zero–dispersion–flattened line with 120–km repeater spacing using carrier–suppressed return–to–zero pulse format", pp. 1–4. No date.

S. Namiki et al., "Recent advances in ultra–wideband Raman amplifiers", pp. 1–3. No date.

Vincent Letellier et al., "Access to Transmission Performance Margins Through Pre–emphasis Adjustment in WDM Systems", Sep., 1998, ECOC '98, pp. 275–276.

Jianping Zhang et al., "Dependence of Raman Polarization Dependent Gain on Pump Degree of Polarization at High Gain Levels", Optical Society of America Pub., 1999, pp. 13–15.

Karsten Rottwitt et al., "Design of Distributed Raman Amplifiers", pp. 1–4. No date.

A. Berntson et al., "Influence of cross–talk and pump depletion on the design of Raman amplifiers for WDM systems", SN 033998–033999. No date.

Neal S. Bergano et al., "Polarization scrambling improves SNR performance in a chain of EDFAs", OFC '94 Technical Digest, pp. 255–256. 1994.

Govind P. Agrawal, "Fiber–Optic Communication Systems—Second Edition", p. 3. No date.

Ekaterina A. Golovchenko et al., "Modeling of Transoceanic Fiber–Optic SDM Communication Systems", IEEE Journal of Selected Topics in Quantum Electronics, Mar.–Apr., 2000, vol. 5, No. 2, pp. 337–347.

F. Liu et al, "Chirped return–to–zero source used in 8×10 Gbit/s transmission over 2000km of standard singlemode fibre", Electronic Letters, Aug., 2000, vol. 36 No. 16, pp. 1399–1400.

Howard Kidorf et al., "Performance improvement in high capacity, ultra–long distance, WDM systems using forward error correction codes", pp. 1–4. No date.

Yanjun Zhu and W. S. Lee et al., "Eight–channel 40 Gb/s RZ transmission over four 80 km spans (328 km) of NDSF with a net dispersion tolerance in excess of 180 ps/nm", pp. 51–53. No date.

Sklar,—Digital Communications Fundamentals and Applications—Chapter 9, Multiplexing and Multiple Access, pp. 475 and 480. No date.

Neal S. Bergano, Chapter 10, "Undersea Amplified Lightwave Systems Design", AT&T Laboratories, pp. 302–335. No date.

AT&T Technical Journal, "Undersea Communications Technology", Jan./Feb., 1995, vol. 74, No. 1, pp. 1–103.

Sergio Tsuda et al., "Transmission of 80×10 Gbit/s WDM channels with 50 GHz spacing over 500 km of LEAF fiber", Corning Inc., pp. 1–4. No date.

F. Forghieri, "Chapter 8—Fiber Nonlinearities and Their Impact on Transmission Systems", vol. IIIA, 1997, pp. 196–265.

Howard Kidorf, "Pump Interactions in a 100–nm Bandwidth Raman Amplifier", IEEE Photonics Technology Letters, vol. 11, No. 5, May 1999, pp. 530–532.

Yoshihiro Emori et al., "Demonstration of Broadband Raman Amplifiers: a Promising Application of High–power Pumping Unit", Furukawa Review, No. 19., 2000, pp. 59–62.

Y. Emori, "100nm bandwidth flat–gain Raman amplifiers pumped and gain–equalised by 12–wavelength–channel WDM laser diode unit", Electronics Letters, Aug. 1999, vol. 35, No. 16, 5 pages.

* cited by examiner

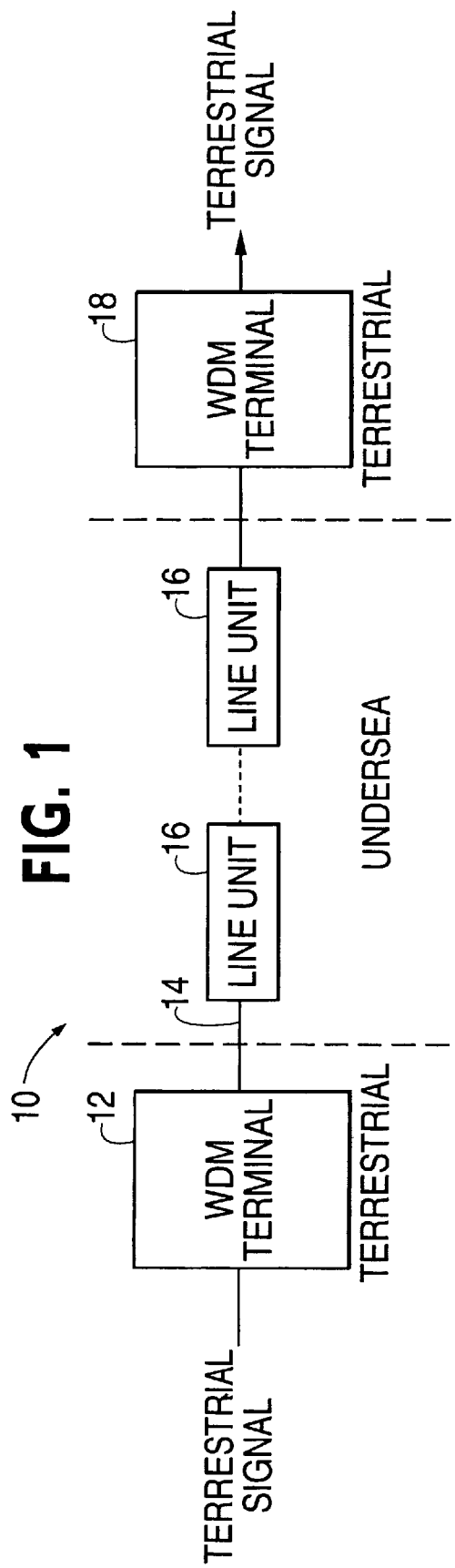

EFFECT OF CHANNEL SPACING VARIATION (CH #1)

CHANNEL SPACING VARIATION (CH#125)

METHODS AND SYSTEMS FOR HIGH PERFORMANCE, WIDE BANDWIDTH OPTICAL COMMUNICATION SYSTEMS USING RAMAN AMPLIFICATION

FIELD OF INVENTION

This invention relates generally to optical communications networks and, more particularly, to methods and systems for providing long haul optical communication systems that employ Raman amplification.

BACKGROUND OF THE INVENTION

From the advent of the telephone, people and businesses have craved communication technology and its ability to transport information in various formats, e.g., voice, image, etc., over long distances. Typical of innovations in communication technology, recent developments have provided enhanced communications capabilities in terms of the speed at which data can be transferred, as well as the overall amount of data being transferred. As these capabilities improve, new content delivery vehicles, e.g., the Internet, wireless telephony, etc., drive the provision of new services, e.g., purchasing items remotely over the Internet, receiving stock quotes using wireless short messaging service (SMS) capabilities etc., which in turn fuels demand for additional communications capabilities and innovation.

Recently, optical communications have come to the forefront as a next generation communication technology. Advances in optical fibers over which optical data signals can be transmitted, as well as techniques for efficiently using the bandwidth available on such fibers, such as wavelength division multiplexing (WDM), have resulted in optical technologies being the technology of choice for state-of-the-art long haul communication systems.

For long haul optical communications, e.g., greater than several hundred kilometers, the optical signal must be periodically amplified to compensate for the tendency of the data signal to attenuate. For example, in the submarine optical communication system 10 shown in FIG. 1, the terrestrial signal is processed in WDM terminal 12 for transmission via optical fiber 14. Periodically, e.g., every 75 km, a line unit 16 amplifies the transmitted signal so that it arrives at WDM terminal 18 with sufficient signal strength (and quality) to be successfully transformed back into a terrestrial signal.

Conventionally, erbium-doped fiber amplifiers (EDFAs) have been used for amplification in the line units 16 of such systems. As seen in FIG. 2(a), an EDFA employs a length of erbium-doped fiber 20 inserted between the spans of conventional fiber 22. A pump laser 24 injects a pumping signal having a wavelength of, for example, approximately 1480 nm into the erbium-doped fiber 20 via a coupler 26. This pumping signal interacts with the f-shell of the erbium atoms to stimulate energy emissions that amplify the incoming optical data signal, which has a wavelength of, for example, about 1550 nm. One drawback of EDFA amplification techniques is the relatively narrow bandwidth within which this form of resonant amplification occurs, i.e., the so-called erbium spectrum. Future generation systems will likely require wider bandwidths than that available from EDFA amplification in order to increase the number of channels (wavelengths) available on each fiber, thereby increasing system capacity.

Like other types of communication technologies which squeeze capacity from a finite amount of bandwidth, WDM optical communication systems must cope with the adverse effects of both noise and intersymbol interference (ISI). Noise tends to make the original signal more difficult to reproduce by adding extraneous energy to the original signal, whereas ISI tends to "smear" the original signal when, for example, signal energy originally transmitted on one wavelength channel bleeds into signal energy originally transmitted on another wavelength channel. With respect to EDFA amplification schemes, noise is a particular problem, since the EDFA amplifier inherently generates a significant amount of noise in the form of amplified spontaneous emission (ASE). ASE occurs because, in addition to generating energy that amplifies the incoming data signal, the decay of the erbium atoms creates light that is itself propagated through the optical fiber along with data signal. Since ASE is generated by each amplifier along the path between terminals, the ASE noise tends to accumulate. In some EDFA systems, the noise accumulates to a degree that the system design may be impacted. Consider, for example, the system described in the article "1800 Gb/s Transmission of One Hundred and Eighty 10 Gb/sWDM Channels over 7,000 km using the Full EDFA C-Band", by C. R. Davidson et al., found in OFC'2000, Paper PD25-1, the disclosure of which is incorporated herein by reference. There, an EDFA optical communication system was tested in a circulating loop and experienced unexpectedly large noise values near the 1532 nm gain peak. To offset the reduced performance caused by this unexpected noise, the channel density in that system was reduced in the vicinity of the accumulated noise.

Distributed Raman amplification is one amplification scheme that can provide a broad and relatively flat gain profile over a wider wavelength range than that which has conventionally been used in optical communication systems employing EDFA amplification techniques. Raman amplifiers employ a phenomenon known as "stimulated Raman scattering" to amplify the transmitted optical signal. In stimulated Raman scattering, as shown in FIG. 2(b), radiation from a pump laser 24 interacts with a gain medium 22 through which the optical transmission signal passes to transfer power to that optical transmission signal. One of the benefits of Raman amplification is that the gain medium can be the optical fiber 22 itself, i.e., doping of the gain material with a rare-earth element is not required as in EDFA techniques. The wavelength of the pump laser 24 is selected such that the vibration energy generated by the pump laser beam's interaction with the gain medium 22 is transferred to the transmitted optical signal in a particular wavelength range, which range establishes the gain profile of the pump laser.

Although the ability to amplify an optical signal over a wide bandwidth makes Raman amplification an attractive option for next generation optical communication systems, the use of a relatively large number of high power pump lasers (and other components) for each amplifier in a Raman system has hitherto made EDFA amplification schemes the technology of choice for long haul optical communication systems. Thus, not surprisingly, the resources employed to design Raman-amplified, long haul communication systems have languished relative to those employed for designing EDFA-amplified long haul systems.

However, as the limits of EDFA amplification are now being reached, recent efforts have begun to explore the design issues associated with supplementing, or replacing, EDFA amplification technology with Raman amplification technology. These efforts have identified ISI (in particular nonlinear effects) associated with optical fiber signal transmission as one of the primary limiters of capacity in systems employing Raman-amplification in wide bandwidth, WDM optical communication systems.

Accordingly, there remains a need for techniques and systems that will enable high capacity, long haul Raman-amplified optical communication systems to enjoy commercial feasibility.

BRIEF SUMMARY OF THE INVENTION

These, and other, drawbacks, limitations and problems associated with conventional optical communication systems are overcome by exemplary embodiments of the present invention, wherein the nonlinear effects which impact wideband, Raman-amplified optical communication systems are examined and system design parameters are adjusted to avoid limitations on system performance imposed by nonlinear effects. More specifically, Applicants have noted that a portion of the data carrying bandwidth is impacted by nonlinear effects to a significantly greater degree than the remainder of the data carrying bandwidth. This, in turn, results in a signal-to-noise ratio ceiling being imposed by the nonlinear portion of bandwidth on the entire data carrying bandwidth, beyond which ceiling the performance of the system degrades to an unacceptable level.

This problem is solved according to exemplary embodiments of the present invention by analyzing and adjusting system parameters so that the entire system SNR can be increased, e.g., on the order of 1 dB. For example, the so-called Q factor performance (described below) of a Raman-amplified optical communication system can be improved by allocating a predetermined bandwidth for communicating optical signals, dividing the predetermined bandwidth into wavelength channels, wherein a first plurality of the wavelength channels have a first spacing and a second plurality of the wavelength channels have a second spacing less than the first spacing, transmitting the optical signals via the wavelength channels; and amplifying the optical signals using Raman amplification, whereupon the first spacing associated with said first plurality of wavelength channels and the second spacing associated with the second plurality of wavelength channels equalizes the Q factors for the optical communication system.

According to another exemplary embodiment of the present invention, a method for communicating optical wave division multiplexed (WDM) signals includes the steps of: providing a first plurality of wavelength channels having a first spacing and a second plurality of said wavelength channels having a second spacing less than the first spacing; communicating optical WDM signals via the first plurality of wavelength channels using a first launch power; and communicating optical WDM signals via the second plurality of wavelength channels using a second launch power; wherein the at least one first launch power is greater than the at least one second launch power.

Even more generally, the present invention teaches that by making the channel spacing a function of the signal launch power, the variance in nonlinear effects associated with launch power tilt can be equalized. Launch power tilt appears as part of an effort to minimize SNR excursion.

BRIEF DESCRIPTION OF THE DRAWINGS

FIG. 1 is a schematic diagram of an optical communication system in which the present invention can be implemented;

DESCRIPTION OF PREFERRED EMBODIMENTS

In the following description, for the purposes of explanation and not limitation, specific details are set forth, such as particular systems, networks, software, components, techniques, etc., in order to provide a thorough understanding of the present invention. However, it will be apparent to one skilled in the art that the present invention may be practiced in other embodiments that depart from these specific details. In other instances, detailed descriptions of known methods, devices and circuits are abbreviated or omitted so as not to obscure the present invention.

Methods and systems for increasing performance in Raman-amplified optical communication systems can be employed in systems such as those depicted in FIG. 1, i.e., submarine optical communication systems, or in terrestrial systems. For the purpose of illustration, rather than limitation, an exemplary Raman-amplified system is described below for context. Those skilled in the art will appreciate that many different system configurations could also implement the present invention.

Figure 2A:
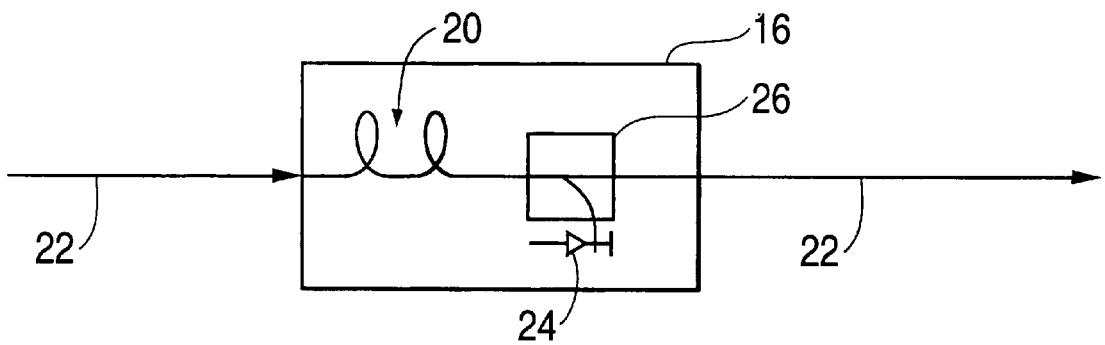
FIG. 2(a) is a conceptual diagram of a conventional erbium-doped fiber amplifier.
Figure 2B:
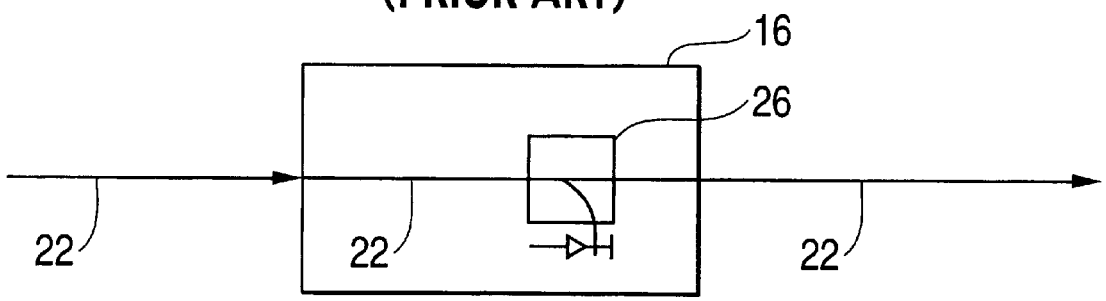
FIG. 2(b) is a conceptual diagram of a conventional Raman amplifier.
Figure 3:
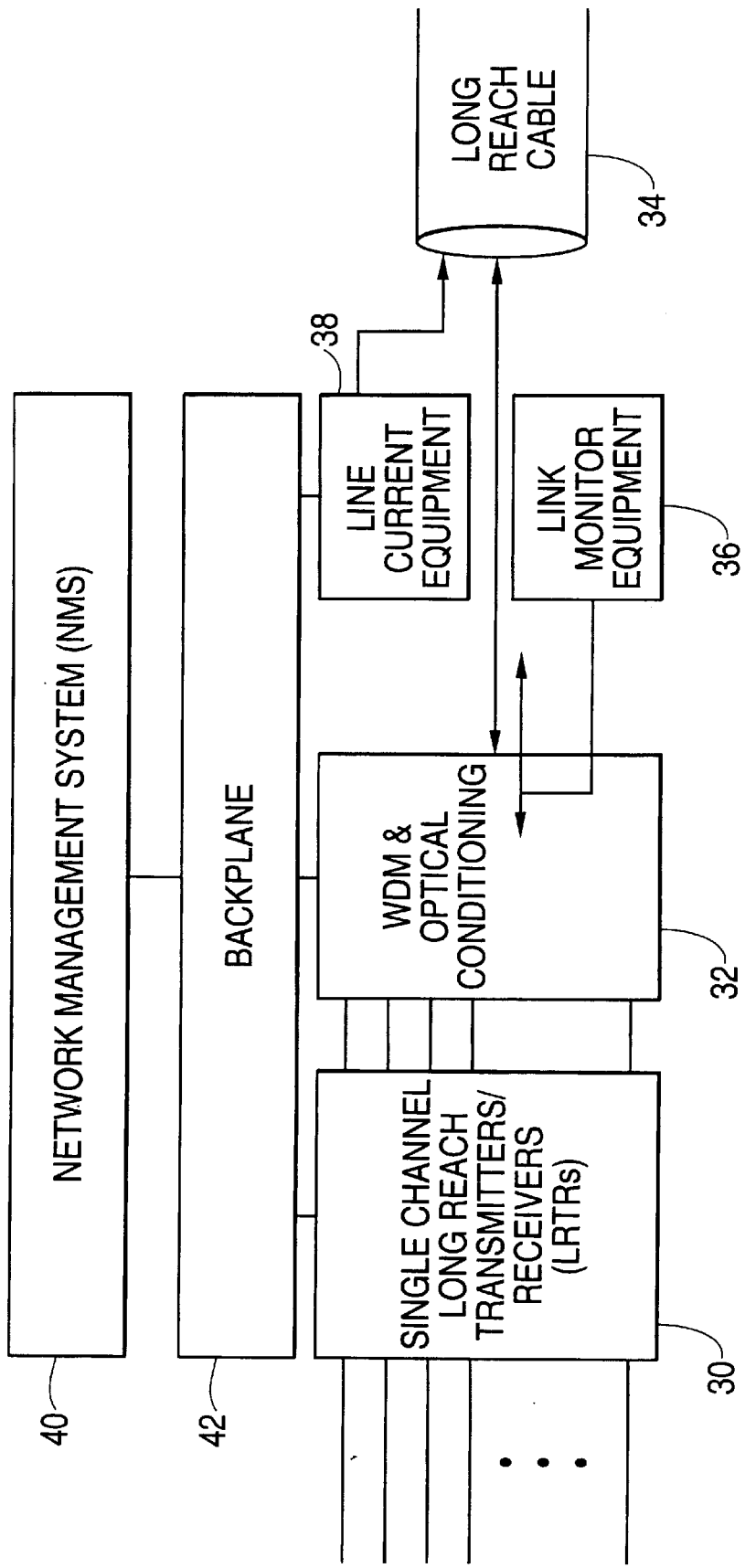
FIG. 3 is a block diagram of an exemplary terminal unit of an optical communication system including link monitoring equipment according to exemplary embodiments of the present invention.

An exemplary architecture for terminal 12 and 18 is provided in the block diagram of FIG. 3. Therein, the long reach transmitters/receivers (LRTRs) 30 convert terrestrial signals into an optical format for long haul transmission, convert the undersea optical signal back into its original terrestrial format and provide forward error correction. The WDM and optical conditioning unit 32 multiplexes and amplifies the optical signals in preparation for their transmission over cable 34 and, in the opposite direction, demultiplexes optical signals received from cable 34. The link monitor equipment 36 monitors the undersea optical signals and undersea equipment for proper operation. The line current equipment 38 provides power to the undersea line units 36. The network management system (NMS) 40 controls the operation of the other components in the WDM terminal, as well as sending commands to the line units 36 via the link monitor equipment 36, and is connected to the other components in the WDM terminal via backplane 42.

Figure 4:
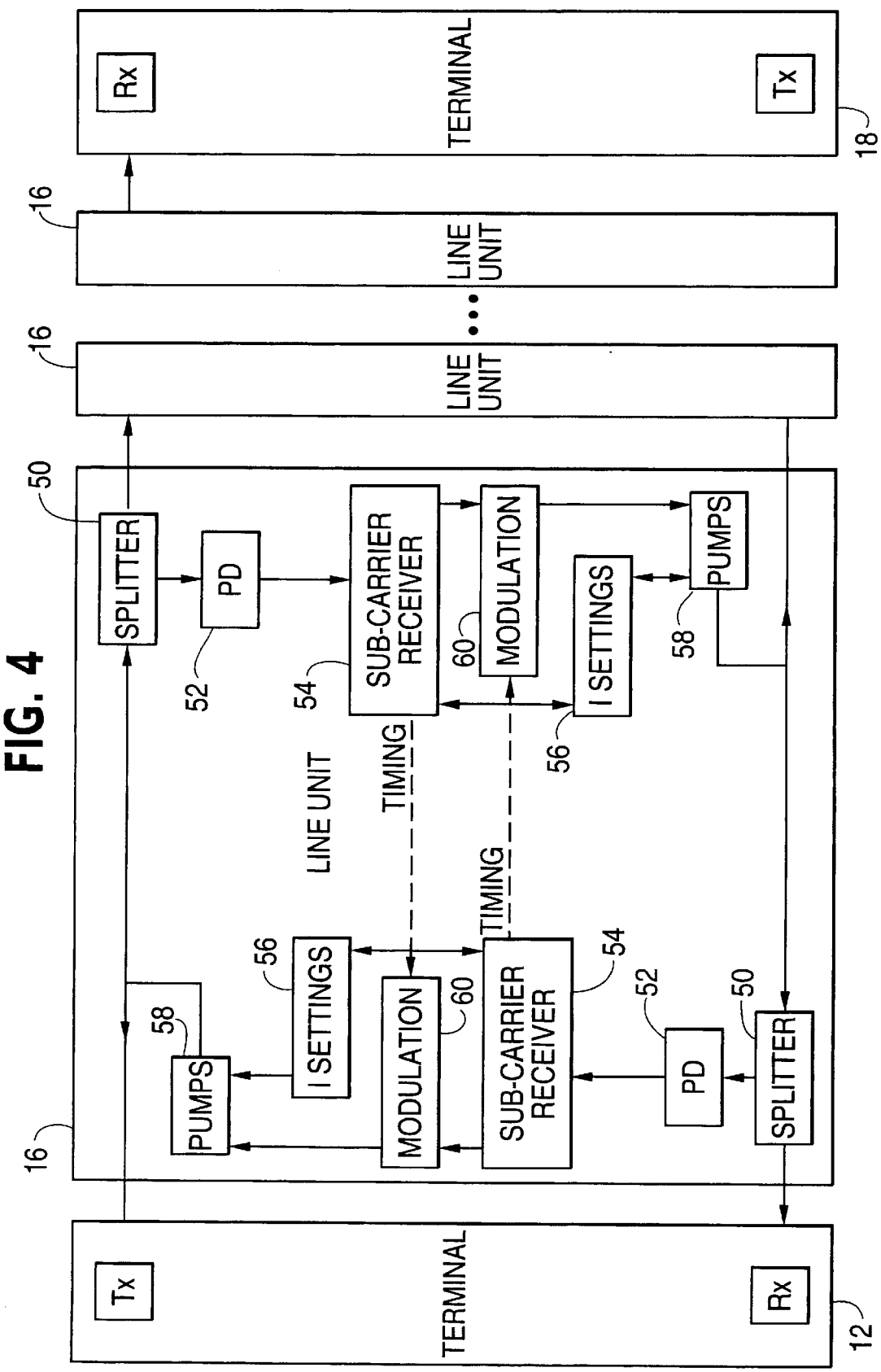
FIG. 4 is a block diagram of an exemplary line unit of an optical communication system in which the present invention can be implemented.

Functional blocks associated with an exemplary line unit 16 are depicted in FIG. 4. Therein, each fiber has a splitter 50 connected thereto to sample part of the traveling WDM data signal. The splitters 50 can, for example, be implemented as 2% tap couplers. A photodetector 52 receives the sampled optical signal from its respective splitter 50 and transforms the optical signal into a corresponding electrical signal. The photodetector 52 outputs the electrical signal to a corresponding sub-carrier receiver unit 54, which detects and decodes the commands present in the sub-carrier modulated monitoring signal that has been modulated on the envelope of the WDM data signal. After decoding the command, the particular sub-carrier receiver 54 determines whether the decoded command is intended for it. If so, the action in the command is executed, e.g., measuring the power of the WDM signal, measuring the pump power output from one or more lasers in the pump assembly, or changing the supply current to the lasers of the pump assembly. To this end, the sub-carrier receivers 54 are connected to respective current control and power monitoring units (I settings) 56, which each include pump power monitors and pump current controls for each laser in the associated pump laser assembly 58.

Figure 5:
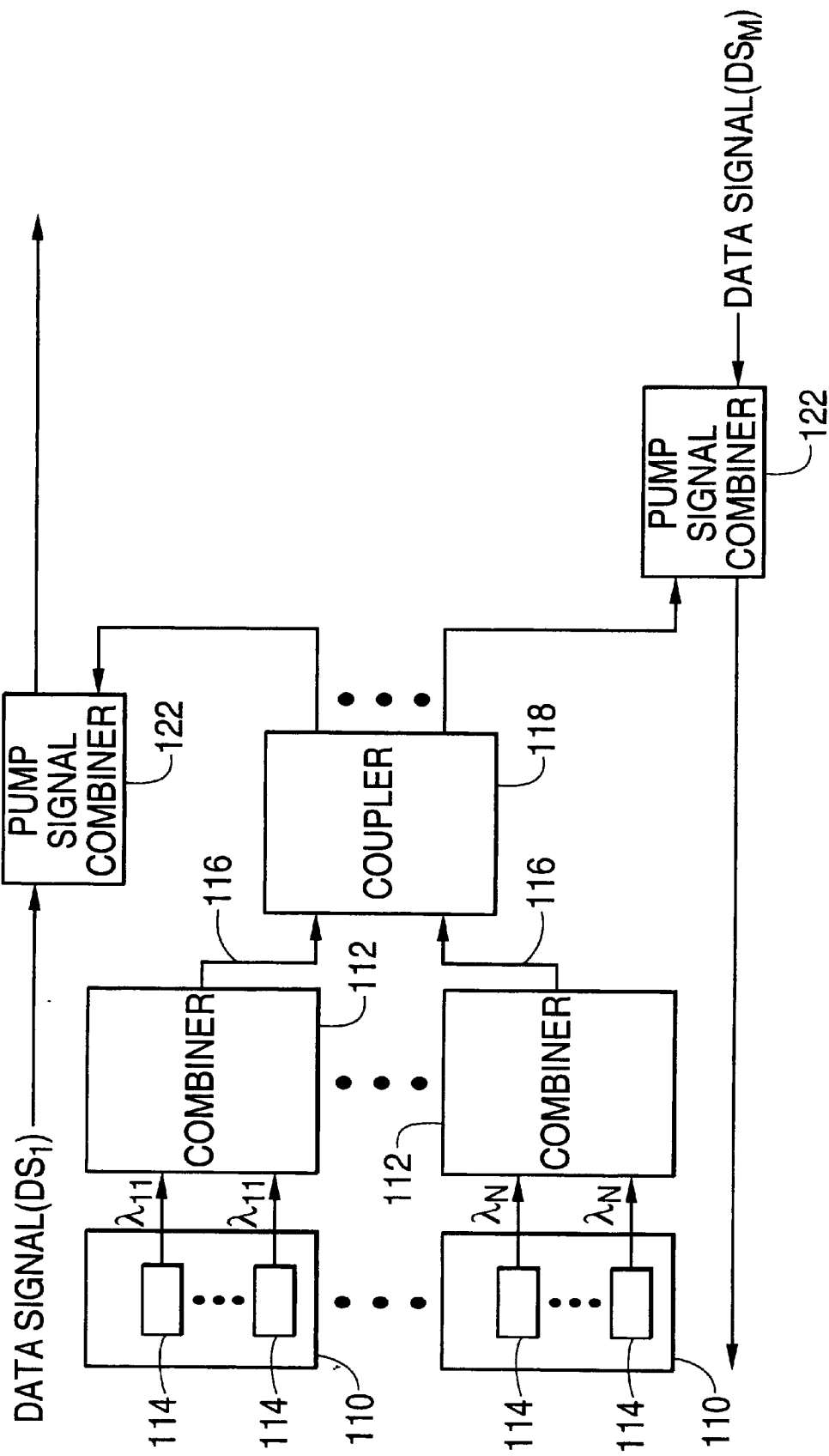
FIG. 5 is another block diagram of an exemplary line unit of an optical communication system including an exemplary Raman pumping architecture.

The pump modules 58 provide pump light into the optical fibers to amplify the data signals traveling therein using a Raman amplification scheme, as generally described above. The gain profile for a single pump wavelength has a typical bandwidth of about 20–30 nm. For high capacity WDM communication applications, such a bandwidth is too narrow and, accordingly, multiple pump wavelengths can be employed to broaden the gain profile. FIG. 5 depicts an exemplary pump architecture for providing multiple pump wavelengths in a Raman amplification scheme.

Therein, a number N of pump radiation sources 110 are optically coupled to a respective one of N pump radiation combiners 112. Each of the pump radiation sources 110 generate various pump wavelengths at various pump powers using individual radiation emitters 114. The individual radiation emitters 114 can, for example, be lasers, light emitting diodes, fiber lasers, fiber coupled microchip lasers, or semiconductor lasers. The combiners 112 combine the various outputs of their respective pump radiation sources, e.g., by wave division multiplexing, and outputs the combined optical pumping signal to coupler 118. Coupler 118 can be an NxM coupler which takes contributions from all N inputs to provide a representative output at each of M output ports. Energy from the coupler 118 is pumped into the optical fiber(s) via pump signal combiners 122. In general, Raman pump architectures couple the light generated by pump lasers at various wavelengths and various powers to the optical fibers to pump the optical data signals. Those skilled in the art will appreciate that many other types of pumping architectures can be employed to provide Raman amplification to optical data signals in accordance with the present invention.

Figure 6:
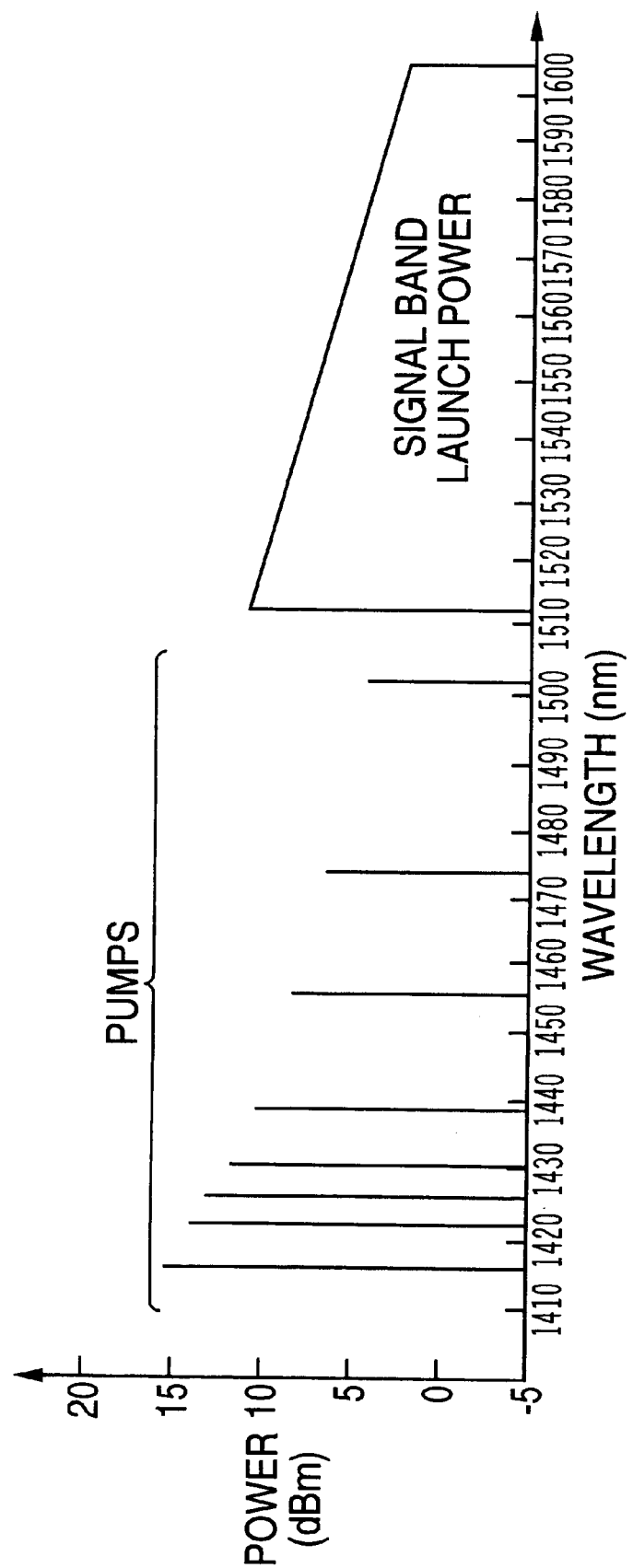
FIG. 6 is a graph depicting exemplary wavelengths and powers for Raman pump lasers and signal channels.

In designing an appropriate (e.g., flat) composite gain profile for the pumping signal, a system designer should consider the Raman pump—pump and signal—signal interactions. Pump-pump interactions refer to the fact that the shorter wavelength pump signals will transfer energy to the longer wavelength pump signals, as well as the optical data signals, due to stimulated Raman scattering. Likewise, signal—signal interactions refer to the fact that the shorter wavelengths in the signal band will amplify the longer wavelengths in the signal band. These effects become more pronounced as the range of wavelengths selected for the signal band increases. Because of the pump—pump and signal—signal interactions, the shorter wavelengths (within both the pump band and the signal band) should be generated at a higher power than the longer wavelengths in wideband Raman-amplified system. For example, FIG. 6 depicts exemplary pump powers and signal band launch powers for achieving a relatively flat composite gain profile using eight different pump wavelengths and an approximate signal band of 100 nm. Those skilled in the art will appreciate that more or fewer than eight pump wavelengths may be used in any given implementation.

As seen therein, the pump power decreases for increasing wavelength. Likewise, the launch power of the shorter wavelength channels is generally larger than the launch power for the higher wavelength channels, unlike EDFA-amplified systems that typically employ a relatively constant launch power across all channels. The slope associated with the launch power as a function of wavelength is sometimes referred to as the launch power tilt, which parameter will be discussed in more detail below. These types of power spectrums for Raman pump wavelengths and the optical data channel wavelengths tend to desirably minimize the excursion in the signal-to-noise ratio (SNR) of the received optical data signal.

Unfortunately, these techniques for minimizing the excursion in the SNR have a less desirable impact when considering the nonlinearities of the optical fiber medium. These nonlinearities, for example self-phase modulation, cross-phase modulation and four-wave mixing, create interactions between the propagating light and the medium and, generally, reduce system performance. The nonlinear effects of the optical fiber medium tend to increase with signal power. Thus, power spectrums employed to minimize SNR excursion result in the shorter wavelengths (higher launch power) experiencing greater nonlinear effects than the longer wavelengths (lower launch power). The greater the launch power tilt, the greater the variance in the nonlinear effects across the signal bandwidth. This variance in nonlinear effects across a wideband in Raman amplified optical communication systems adversely impacts overall system performance.

When considering optical communication system performance generally, it is important to consider (in addition to SNR) a parameter known as the Q factor, which is generally considered to be a good measure of overall system performance because it takes into account both noise and ISI (e.g., the aforementioned nonlinear effects). Specifically, the Q factor is related to bit error ratio (BER) as it is the argument to the normal error function used to calculate the BER. A detailed discussion of the Q factor, and its general use in optical system performance measurement, is beyond the scope of this discussion however the interested reader is referred to *Optical Fiber Telecommunications*, edited by Kaminow and Koch, Volume IIIA, Chapter 10, pp. 314–329 (1997), the disclosure of which is incorporated here by reference. What is significant, however, is that the Q factor is an important design factor in optical communication systems that typically is used to provide a performance target for the system as a whole.

Figure 7:
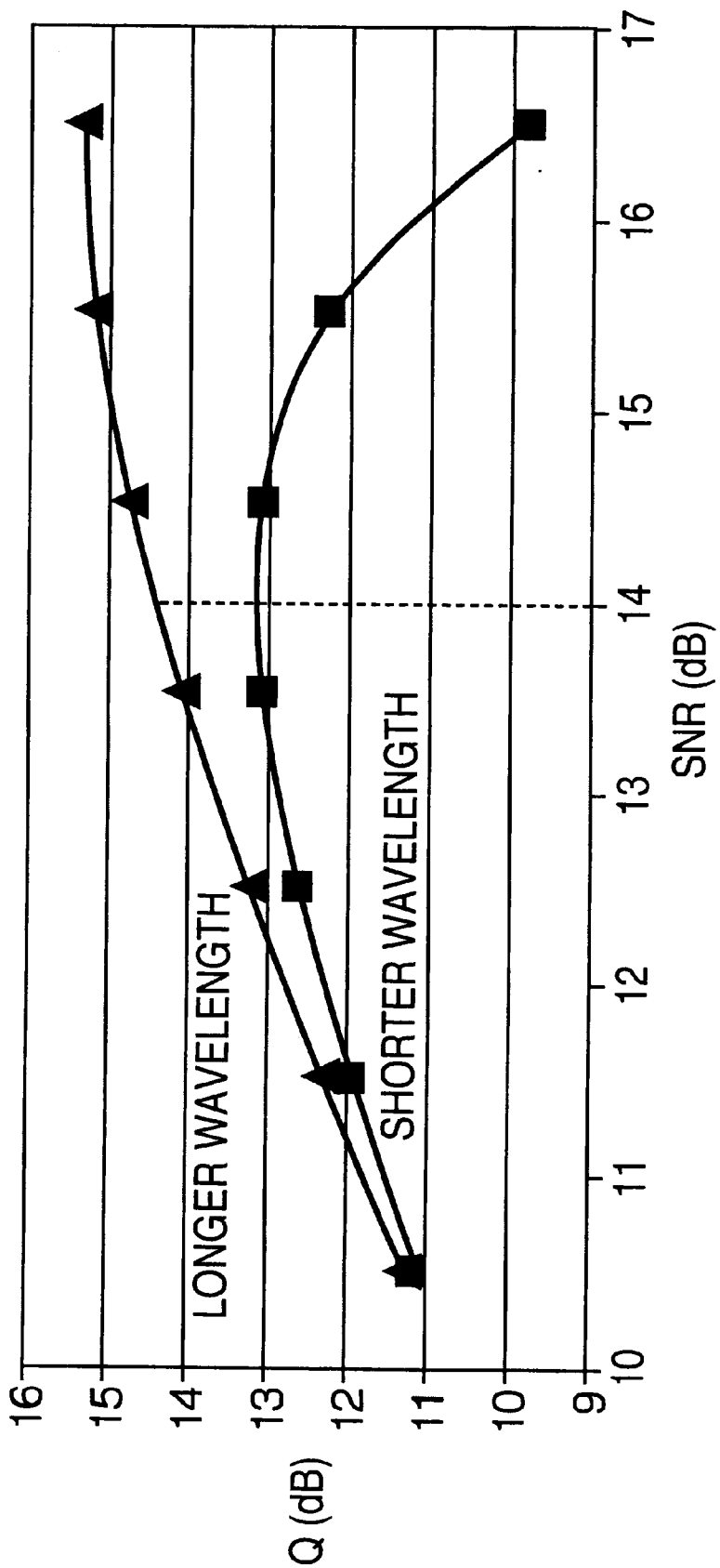
FIG. 7 is a graph illustrating the variance in the nonlinear effects on a wideband, Raman-amplified system wherein both a shorter wavelength channel and a longer wavelength channel are plotted as functions of Q factor vs. SNR.

FIG. 7 presents a graph plotting the Q factor as a function of SNR for an exemplary Raman amplified system, using a pumping scheme that is similar to that described above and with a launch power tilt of about 4 dB, i.e., the launch power of the shortest wavelength channel in the signal band is about 4 dB greater than the launch power of the longest wavelength channel. Specifically, Q vs SNR is plotted for both a shorter wavelength channel and a longer wavelength channel in a WDM Raman amplified system having a channel spacing of 50 GHz. Note that the particular values depicted in this graph and the particular pumping scheme used to generate these values are not significant per se, instead what should be noted from this particular Figure is that the Q factor performance of the shorter wavelength channel is worse than that of the longer wavelength channel. Moreover, the difference in Q factor performance tends to increase with SNR and the Q performance of the shorter wavelength peaks before that of the longer wavelength (in this example the shorter wavelength peaks at an SNR of about 14 dB). Note also the relatively large difference between the Q factor of the shorter wavelength channel and the Q factor of the longer wavelength channel, e.g., about 1–1.5 dB at an SNR of about 14 dB.

Figure 8:
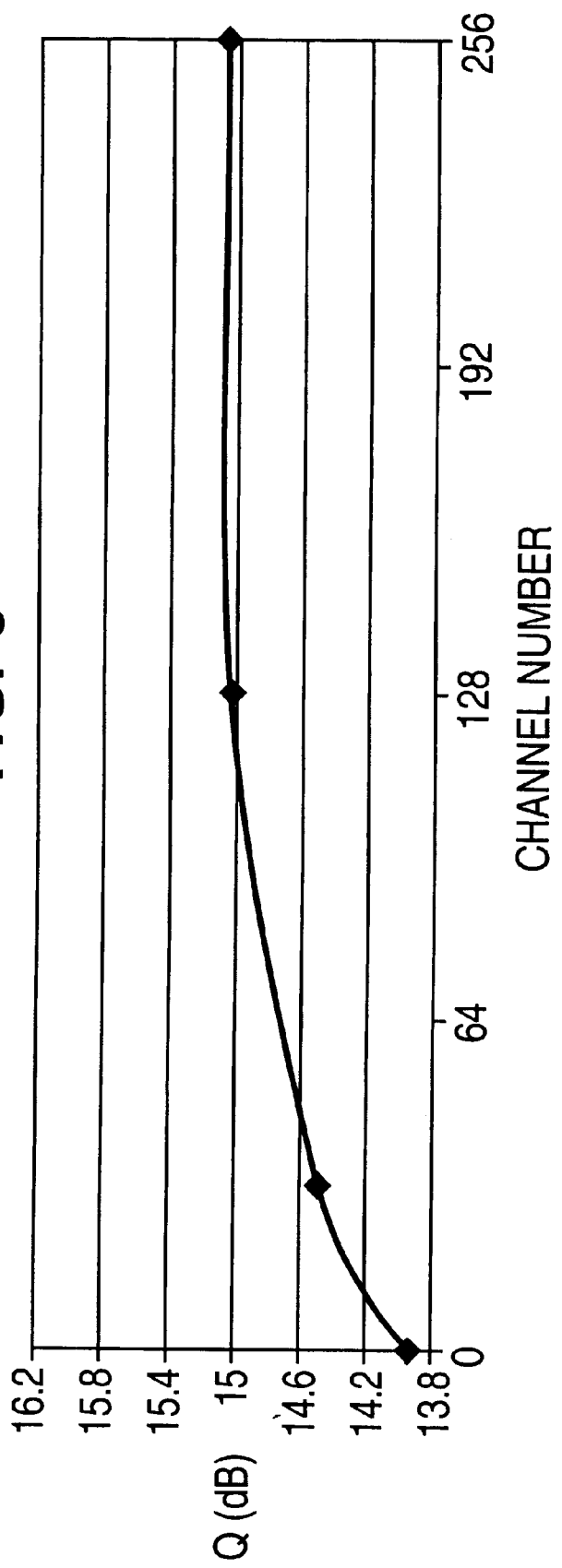
FIG. 8 is a graph which also depicts the variance in nonlinear effects for an exemplary system wherein the Q performance is plotted as a function of channel number.

FIG. 8 is a graph of the Q factor as a function of channel number, where increasing channel number corresponds to increasing wavelengths. Again, the phenomenon described above with respect to FIG. 7 is also seen here, as the system performance in the lower numbered channels is distinctly poorer than that of the higher numbered channels. For the reasons described above, given the tension in Raman amplified systems between minimizing SNR excursion and equalizing nonlinear effects, Applicants believe that this phenomenon will be common to all wideband applications of Raman amplified optical communication systems.

The issue then becomes one of system design given this phenomenon. A straightforward way of approaching this problem is to accept that the system will be performance limited by the shorter wavelength channels. Thus, taking the exemplary system characteristics depicted in FIG. 7, a system designer might conclude that it would be undesirable to increase the launch power to a point beyond which the shorter wavelength channel's Q performance begins to significantly drop off, e.g., an SNR of 14 dB and a Q of slightly more than 13 dB. This has the unfortunate ramification of limiting the better performing longer wavelength channels' Q performance, which could otherwise accept higher power without Q degradation, i.e., the system becomes limited by the greater nonlinear effects experienced in the shorter wavelength portion of the data carrying bandwidth.

Exemplary embodiments of the present invention provide techniques and systems for addressing this dilemma. Specifically, exemplary embodiments of the present invention provide techniques and systems which permit higher system launch power by substantially equalizing the system Q performance across the entire bandwidth of a Raman amplified optical communication system. The following test simulation studies were based on an exemplary Raman-amplified optical communication system having the following parameters:

| | |
|---|---|
| Data Rate per Channel | 10 Gb/s |
| FEC Overhead | 15% |
| Transmission Distance | 7500 km |
| Span Length | 60 km |
| Dispersion Map | 22 km SMF + 30 km IDF + 8 km SMF |
| Total Bandwidth | ~100 nm |
| Dispersion Slope | Assumed to be zero |
| Total Pump Power | ~810 mW |
| Launch Power Tilt | ~4 dB |

The increase in nonlinear effects, which are the result of the variable launch powers used to equalize the SNR excursion are, according to these exemplary embodiments, offset by increased spacing between selected channels. More specifically, by increasing the channel spacing of selected channels as a function of launch power tilt, the Q factor for the entire system can be equalized and system SNR raised. Note that, unlike the above incorporated article by Davidson et al. describing the use of increased channel spacing to offset unexpected noise in an EDFA-amplified system, exemplary embodiments of the present invention provides techniques for selecting channel spacings as a function of launch power tilt to offset the variance in nonlinear effects caused by the launch power tilt in a Raman-amplified system.

Figure 9:
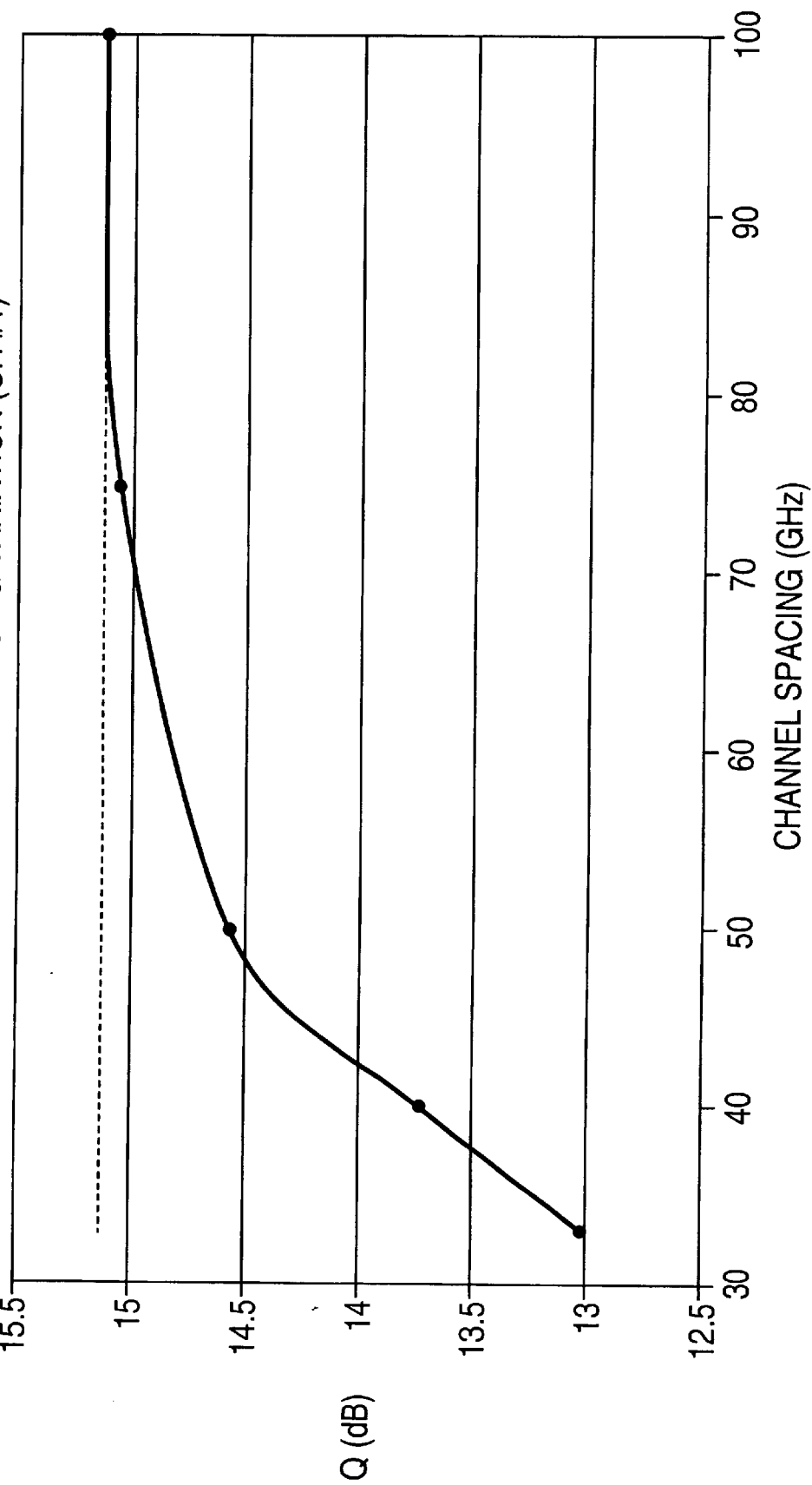
FIG. 9 is a graph which illustrates the effect of varying the channel spacing for channel #1 by plotting the Q factor as a function of channel spacing for a Raman-amplified optical communication system according to an exemplary embodiment of the present invention.
Figure 10:
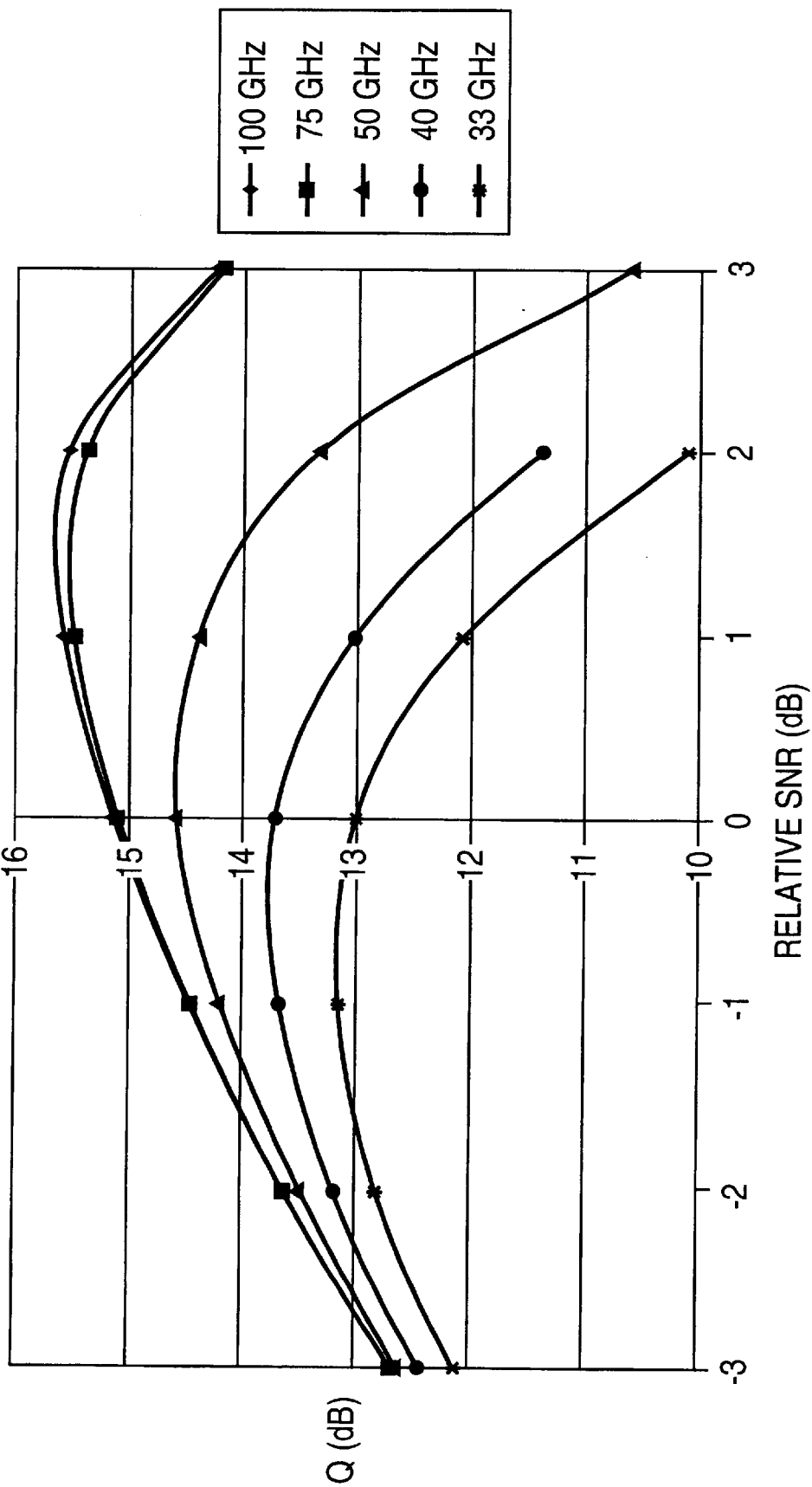
FIGS. 10–12 are graphs which also illustrates the effect of varying the channel spacing by comparing Q factor vs. relative SNR of channels #1, #25 and #125, respectively, at different channel spacings.

A first example is provided in FIG. 9, where the impact of increased channel spacing in the most nonlinear (highest launch power) region of a Raman system is evaluated. Therein, the effect of increasing the channel spacing between channels 1 and 2 is shown to increase the Q performance of channel 1, ultimately close to single channel performance at a spacing of 80 GHz and beyond. The impact of increased channel spacing on the ability to increase launch power (which results in increased SNR) in the shorter wavelengths is shown in the graph of FIG. 10. Therein, it can be seen that the point at which the Q performance of channel 1 drops off with increased SNR shifts to the right as channel spacing increases.

Figure 11:
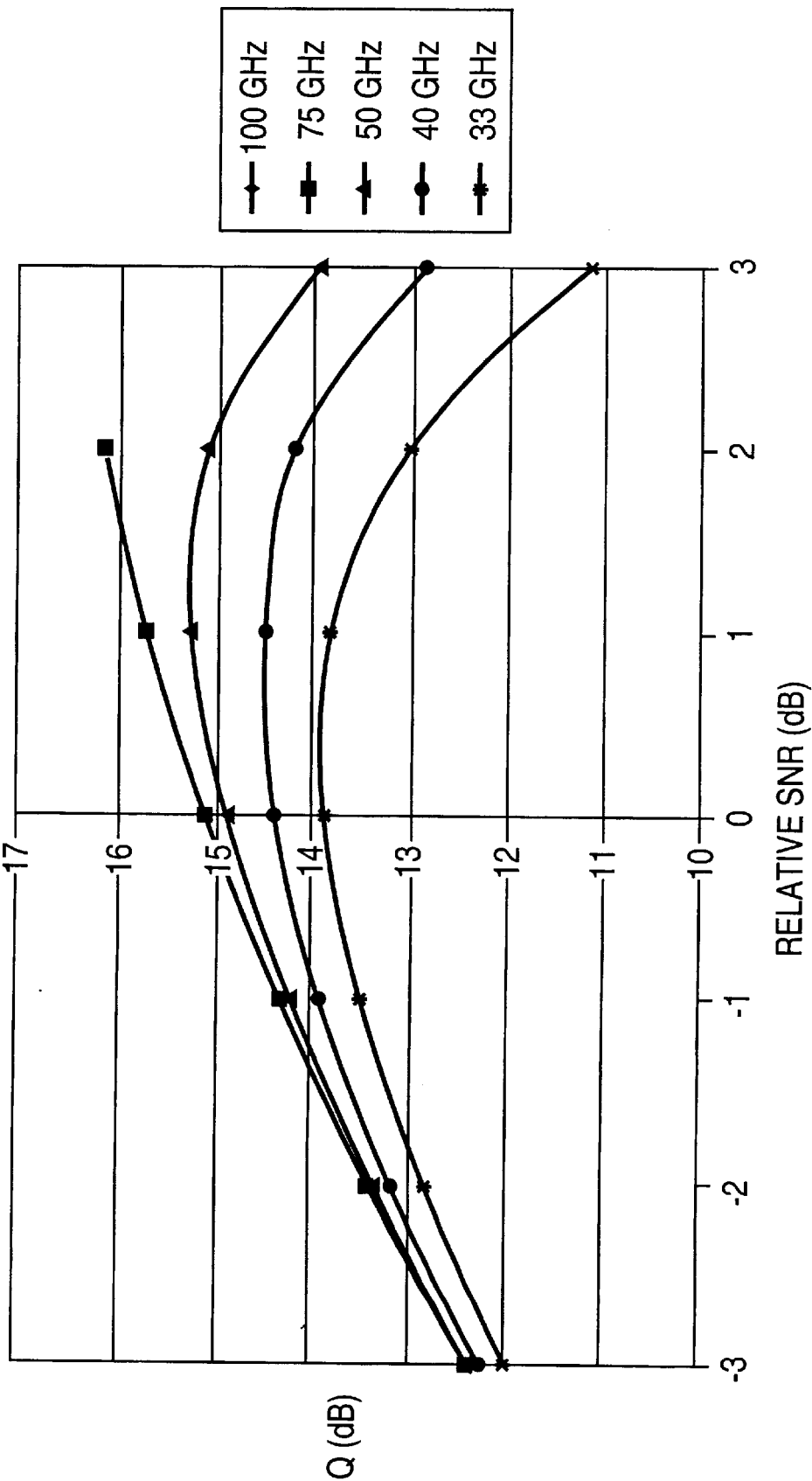
Figure 12:
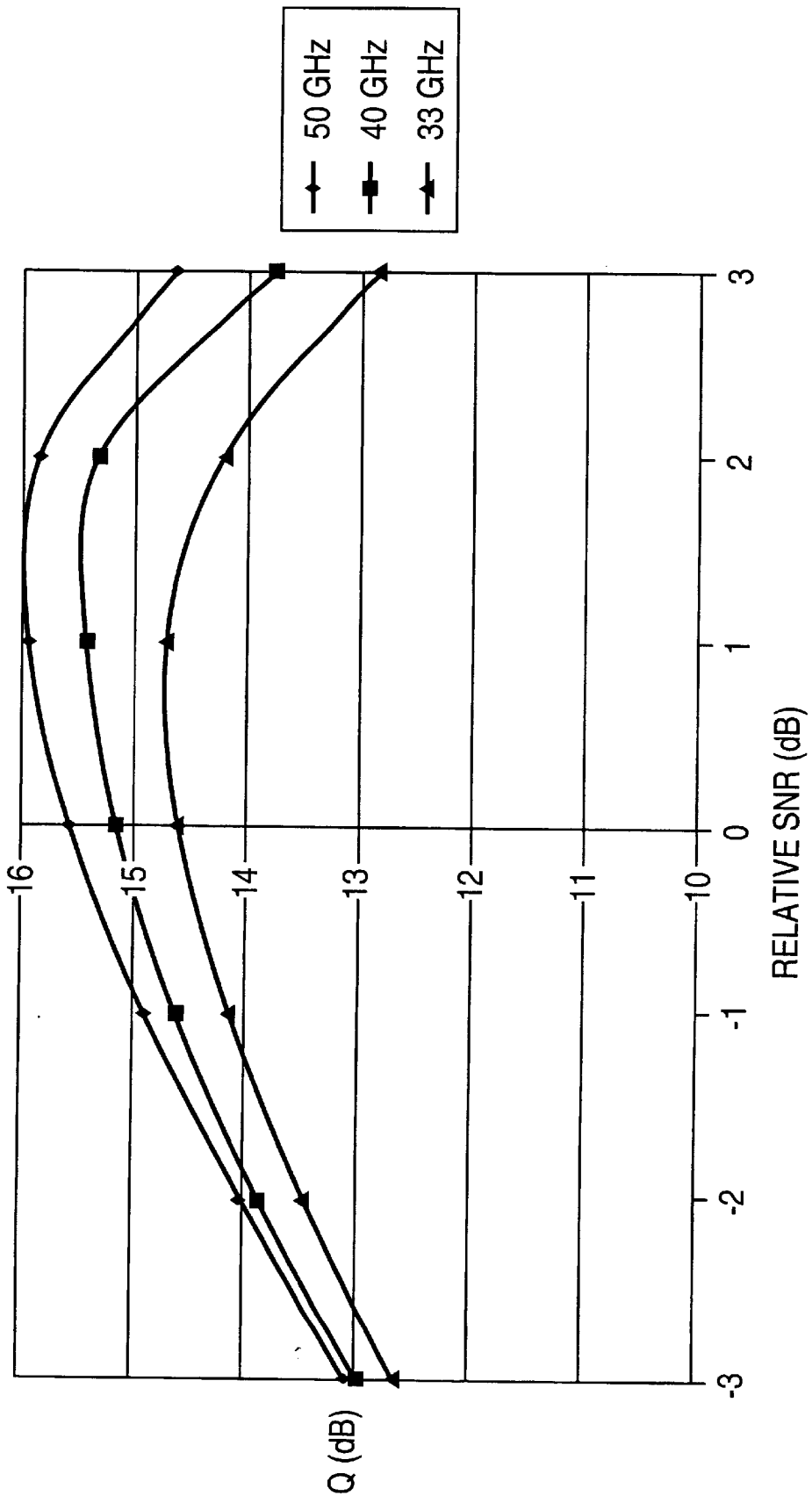

Applicants have likewise studied the impact of wider channel spacings at higher numbered channel (longer wavelengths), examples of which are provided as FIGS. 11 and 12 for channel numbers 25 and 125, respectively. These graphs indicate that the benefits of wider channel spacings, from a Q performance perspective, tend to diminish with increased wavelength.

These results have enabled Applicants to design Raman-amplified optical communication systems that have substantially the same Q factor across the entire channel range. Specifically, by widening the channel spacing in the region of the signal bandwidth where the launch power and nonlinear effects are significantly higher, Applicants have designed Raman-amplified optical communication systems wherein the Q performance of the channels in the nonlinear region can be made substantially similar to that of the other channels.

Figure 13:
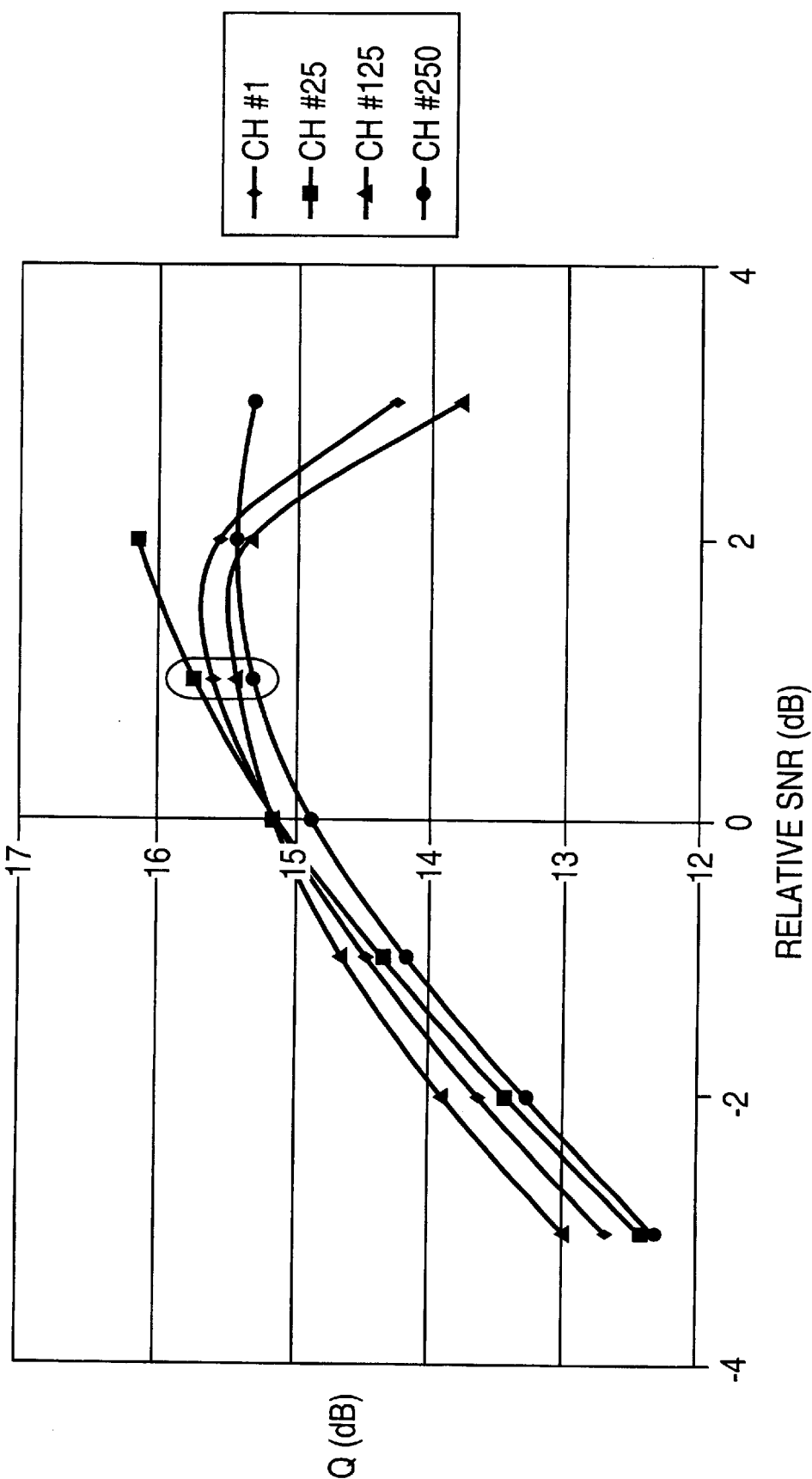
FIGS. 13 and 14 are graphs that illustrate the improved system performance by adjusting the channel spacing within the data carrying bandwidth according to exemplary embodiments of the present invention.
Figure 14:
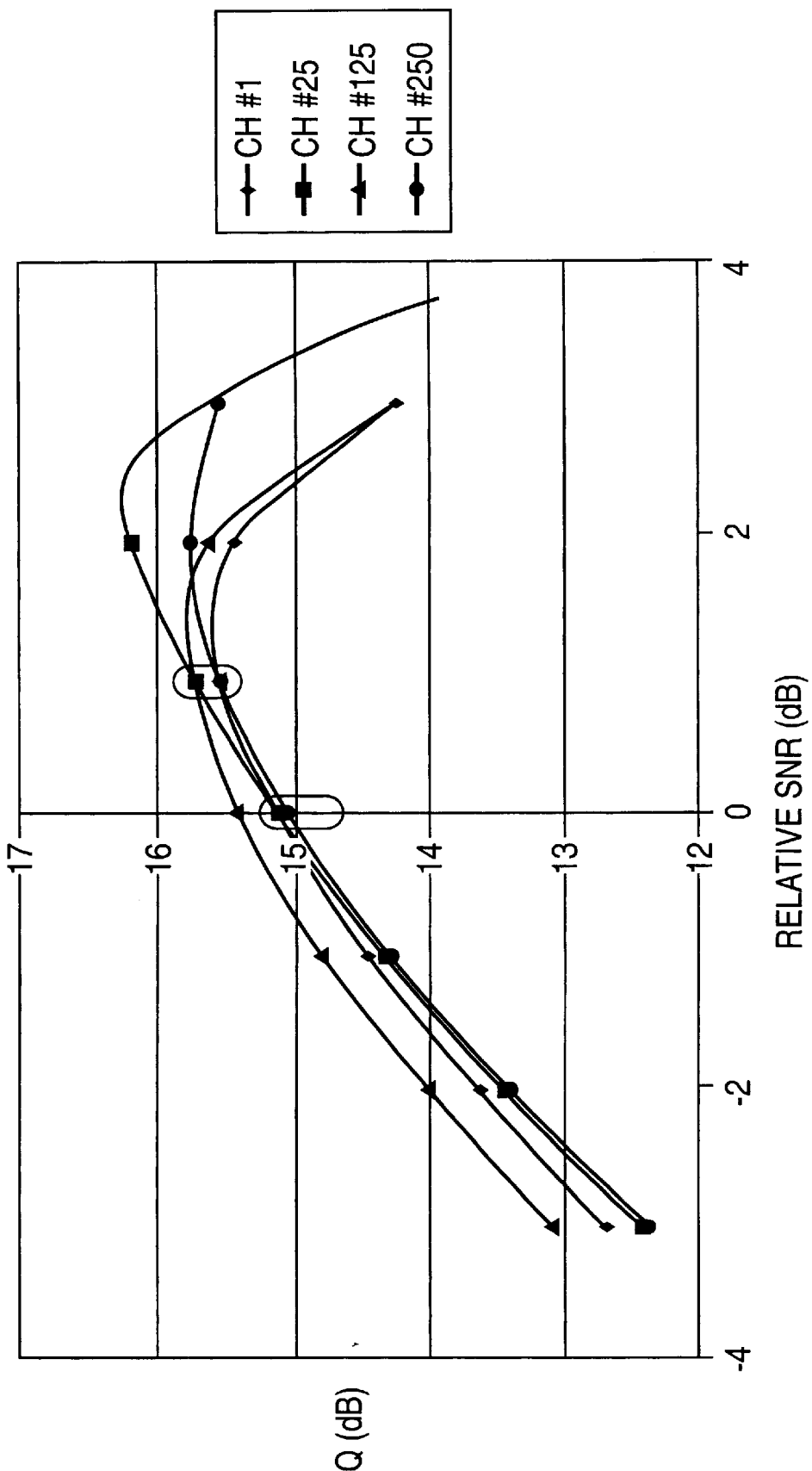

Consider, for example, the graph of FIG. 13. Therein, the first 40 channels have a spacing of 100 GHz, while the remaining 210 channels have a spacing of 40 GHz. Plotted here are the Q performances for channels #1, 25, 125 and 250 across a range of relative SNRs (the actual SNR at 0 is about 14 dB). Note that the Q performance on each of these channels is substantially similar over a broad range of SNRs (e.g., a Q range of less than about 0.5 dB at SNRs greater than 12 dB) that could be selected for system operation. In particular, this graph illustrates that the system is no longer limited by the Q factor performance of the lower numbered channels and that it can operate at higher SNRs, meaning that launch power across the data carrying bandwidth can be increased. Another example is provided in FIG. 14. Therein, the first 30 channels have a spacing of 90 GHz, while the remaining 220 channels have a spacing of 45 GHz. Once again, the channels are closely grouped in their Q performance so that no particular channel or group of channels mandates a low overall system SNR.

In the foregoing examples, the channel spacing was increased for about the first 12% of the data carrying bandwidth. Of course, system implementations will vary, however Applicants contemplate that increased channel spacing for the first 10–15% of the channel bandwidth will provide the desired Q factor equalization described above for most wideband, Raman-amplified optical communication systems. Those skilled in the art will recognize that there is a tradeoff between increased channel spacing and system capacity, e.g., doubling the channel spacing for the first 12% of the bandwidth reduces overall capacity by 6%. One approach is to accept the reduced capacity in favor of the improved system performance.

Another approach is to reduce the channel spacing of the channels outside of the highly nonlinear region of the bandwidth to compensate, partially or completely, for the increased channel spacing of the channels that are in the nonlinear portion. For example, if the channel spacing of the first 12% of the bandwidth is doubled, then the channel spacing of the remaining 88% can be reduced by 6%, e.g., from 50 GHz to 47 GHz. This reduction in channel spacing will slightly increase the nonlinear effects for the remaining 88% of the bandwidth, but will restore the overall capacity of the system to that of uniform channel spacing across the entire bandwidth. Those skilled in the art will appreciate, therefore, that the present invention contemplates a widening of the channel spacing in the nonlinear portion of the bandwidth, e.g., the first 10–15%, and, optionally, a reduction in the channel spacing of the remaining bandwidth, e.g., 90–85%.

Figure 15:
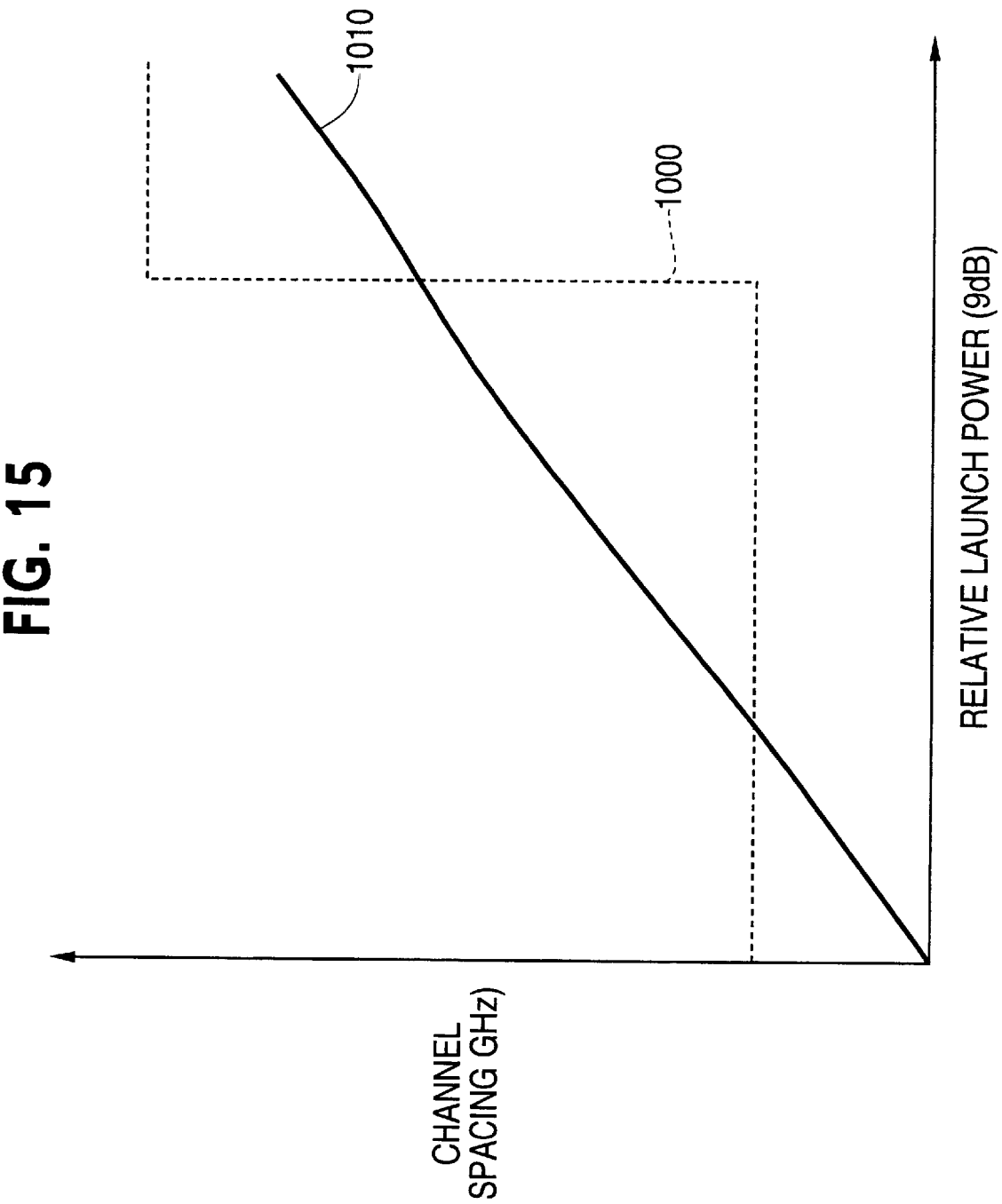
FIG. 15 is a graph depicting exemplary functional relationships between channel spacing and signal launch power according to the present invention.

As mentioned earlier, the present invention recognizes the impact of launch power tilt on Q performance of Raman-amplified optical communication systems. Although the foregoing exemplary embodiments have focused on increasing the channel spacing by a fixed amount in the most non-linear region of the signal bandwidth and then either maintaining or reducing the channel spacing in the remainder, those skilled in the art will appreciate that the present invention can also be implemented to provide more than two different channel spacings within the signal band. In fact, at its most general, the present invention contemplates that channel spacing for wideband Raman systems will be selected as a function of the launch power tilt. Consider FIG. 15 which depicts various such functions. As described above, a step function 1000 can be employed wherein two different channel spacings are used in the signal bandwidth with the smaller channel spacing being provided over the lower launch power and the greater channel spacing being provided over the higher launch power. Alternatively, it would also be possible to increase the spacing between each of N channels as shown by function 1010. Of course it is further possible to use functions between the two which are illustrated in FIG. 16, i.e., having more than two steps and less than N−1 steps, the selection of which will be guided by the recognition that more variations in channel spacing also tend to increase system complexity. To equalize Q performance across the signal bandwidth, the selected function should also follow the general relationship that a 1 dB launch power tilt can be offset by approximately a 25% channel spacing increase.

The preferred embodiments have been set forth herein for the purpose of illustration. However, this description should not be deemed to be a limitation on the scope of the invention. Accordingly, various modifications, adaptations, and alternatives may occur to one skilled in the art without departing from the scope of the claimed inventive concept.

What is claimed is:

1. A method for equalizing Q factors associated with system performance in a Raman-amplified optical communication system, said method comprising the steps of:
    allocating a predetermined bandwidth for communicating optical signals;
    dividing said predetermined bandwidth into wavelength channels, wherein a first plurality of said wavelength channels have a first spacing and a second plurality of said wavelength channels have a second spacing less than said first spacing;
    transmitting said optical signals via said wavelength channels; and
    amplifying said optical signals using Raman amplification, wherein said first spacing associated with said first plurality of wavelength channels in combination with said second spacing associated with said second plurality of wavelength channels equalizes said Q factors across said predetermined bandwidth for said optical communication system.

2. The method of claim 1, wherein said first group of channels occupies approximately 10–15% of said predetermined bandwidth.

3. The method of claim 2, wherein said first group of channels occupies approximately 12% of said predetermined bandwidth.

4. The method of claim 2, wherein said predetermined bandwidth is between 50–150 nm.

5. The method of claim 4, wherein said predetermined bandwidth is about 100 nm.

6. The method of claim 2, wherein said first group of channels has approximately double the channel spacing of said second group of channels.

7. The method of claim 6, wherein said first group of channels are spaced apart by about 100 GHz and said second group of channels are spaced apart by about 47 GHz.

8. The method of claim 1, wherein said step of dividing said predetermined bandwidth further comprises the step of:
    determining a total number of said wavelength channels, wherein a uniform spacing equals said predetermined bandwidth divided by said total number of channels; and
    selecting said first spacing to be greater than said uniform spacing such that said Q factor for said first plurality channels is higher than it would be if said uniform spacing was employed.

9. The method of claim 8, further comprising the step of:
    selecting said second spacing to be less than said uniform spacing.

10. The method of claim 1, further comprising the step of:
    selecting said second spacing to compensate for a reduction in the number of channels caused by a selection of said first spacing.

11. The method of claim 1, wherein said Q factors fall within about 0.5 dB of one another over a range of signal-to-noise ratios (SNR), said range including an SNR of 14 dB.

12. The method of claim 1, further comprising the step of:
selecting said first and second spacings based on launch powers of said optical signals.

13. The method of claim 1, wherein a Q factor associated with a worst-performing channel is improved by the first spacing.

14. A method for communicating optical wave division multiplexed (WDM) signals comprising the steps of:
providing a first plurality of wavelength channels having a first spacing and a second plurality of said wavelength channels having a second spacing less than said first spacing;
communicating optical WDM signals via said first plurality of wavelength channels using a first launch power; and
communicating optical WDM signals via said second plurality of wavelength channels using a second launch power;
wherein said at least one first launch power is greater than said at least one second launch power.

15. The method of claim 14, further comprising the step of:
amplifying said optical WDM signals using Raman amplification.

16. The method of claim 14, further comprising the steps of:
providing a third plurality of wavelength channels having a third spacing which is different than said first spacing and said second spacing; and
communicating optical WDM signals via said third plurality of using a third launch power different than said first and second launch power.

17. The method of claim 14, wherein said first plurality of wavelength channels occupies approximately 10–15% of a predetermined bandwidth.

18. The method of claim 17, wherein said first plurality of wavelength channels occupies approximately 12% of said predetermined bandwidth.

19. The method of claim 17, wherein said predetermined bandwidth is between 50–150 nm.

20. The method of claim 18, wherein said predetermined bandwidth is about 100 nm.

21. The method of claim 14, wherein a difference between said first launch power and said second launch power is greater than 3 dB.

22. An optical communication system comprising:
first and second terminals connected together by a plurality of optical fibers, wherein said first and second terminals communicate optical signals over a predetermined bandwidth having a plurality of wavelength division multiplexed (WDM) channels associated therewith; and
a plurality of line units, disposed between said first and second terminals and connected to said plurality of optical fibers, for amplification of said optical signals,
wherein said plurality of WDM channels include a first group of channels and a second group of channels, said first group of channels being spaced apart more widely than said second group of channels
wherein said first and second terminals transmit said optical signals on said first group of channels at a higher power level than said second group of channels.

23. The optical communication system of claim 22, wherein said first group of channels occupies approximately 12% of said predetermined bandwidth.

24. The optical communication system of claim 23, wherein said predetermined bandwidth is between 50–150 nm.

25. The optical communication system of claim 22, wherein said predetermined bandwidth is about 100 nm.

26. The optical communication system of claim 25, wherein said first group of channels has approximately double the channel spacing of said second group of channels.

27. The optical communication system of claim 26, wherein said first group of channels are spaced apart by about 100 GHz and said second group of channels are spaced apart by about 47 GHz.

28. The optical communication system of claim 22, wherein said line units include a plurality of pump lasers coupled to said plurality of optical fibers for performing said Raman amplification.

29. The optical communication system of claim 22, wherein said line units include optical fiber, which is not doped with a rare-earth material, as a gain medium for Raman amplification of said optical signals.

30. The optical communication system of claim 28, wherein each of said plurality of pump lasers has a pump wavelength which is selected such that together said pump lasers provide a relatively flat Raman gain profile to said optical signals.

* * * * *